United States Patent
Chen

(10) Patent No.: US 8,012,230 B2
(45) Date of Patent: Sep. 6, 2011

(54) STRUCTURE OF AN IMPURITIES COLLECTING BUCKET FOR AN AIR SEPARATOR AND PURIFIER

(76) Inventor: Ging-Chung Chen, Danshui Town (TW)

( * ) Notice: Subject to any disclaimer, the term of this patent is extended or adjusted under 35 U.S.C. 154(b) by 0 days.

(21) Appl. No.: 11/882,077

(22) Filed: Jul. 30, 2007

(65) Prior Publication Data

US 2011/0131936 A1    Jun. 9, 2011

(51) Int. Cl.
*B01D 45/18* (2006.01)
(52) U.S. Cl. ............... 55/428; 55/429; 55/430; 55/432; 55/424; 55/425; 55/426; 55/320; 55/385.1; 55/435; 55/419; 55/DIG. 3
(58) Field of Classification Search ............... 55/428, 55/429, 430, 432, 424–426, 320, 358.1, 435, 55/DIG. 3, 419
See application file for complete search history.

(56) References Cited

U.S. PATENT DOCUMENTS

| 4,201,256 A * | 5/1980 | Truhan .................. 144/252.2 |
|---|---|---|
| 4,463,474 A * | 8/1984 | Jacobs ........................ 15/353 |
| 5,120,165 A * | 6/1992 | Walko, Jr. .................... 406/40 |
| 5,231,805 A * | 8/1993 | Sander ......................... 451/88 |
| 5,343,592 A * | 9/1994 | Parise .......................... 15/353 |
| 5,525,396 A * | 6/1996 | Rudolph et al. .............. 428/131 |
| 5,606,767 A * | 3/1997 | Crlenjak et al. ................ 15/301 |
| 6,117,201 A * | 9/2000 | Cheng .......................... 55/356 |
| 6,210,457 B1 * | 4/2001 | Siemers ........................ 55/429 |
| 6,289,956 B1 * | 9/2001 | Shriver ..................... 144/252.1 |
| 6,471,751 B1 * | 10/2002 | Semanderes et al. .......... 95/271 |
| 6,767,380 B2 * | 7/2004 | von Stackelberg, Jr. ......... 55/431 |
| 6,833,016 B2 * | 12/2004 | Witter ........................... 55/337 |
| 6,837,990 B2 * | 1/2005 | Orillion .......................... 210/95 |
| 7,235,121 B2 * | 6/2007 | West .............................. 95/273 |
| 7,282,074 B1 * | 10/2007 | Witter ........................... 55/300 |
| 7,399,218 B2 * | 7/2008 | Witter .......................... 451/353 |
| 7,615,089 B2 * | 11/2009 | Oh ................................ 55/337 |
| 7,682,412 B2 * | 3/2010 | Oh ................................ 55/345 |
| 7,731,771 B2 * | 6/2010 | Lee et al. ........................ 55/343 |
| 2005/0050863 A1 * | 3/2005 | Oh ................................ 55/345 |
| 2006/0278081 A1 * | 12/2006 | Han et al. ........................ 96/61 |

* cited by examiner

*Primary Examiner* — Jason M Greene
*Assistant Examiner* — Dung Bui
(74) *Attorney, Agent, or Firm* — Muncy, Geissler, Olds & Lowe, PLLC

(57) ABSTRACT

A structure of an impurities collecting bucket for an air separator and purifier, primarily structured from a bucket and an air guide cover, wherein the air guide cover covers an opening at an upper end of the bucket, and is provided with an air inlet and an air suction port. A guide pipe extends from the air inlet and connects to a work place, and another guide pipe connects the air suction port to an air inlet of an air separator and purifier for series operation.

6 Claims, 7 Drawing Sheets

STRUCTURE OF AN IMPURITIES COLLECTING BUCKET FOR AN AIR SEPARATOR AND PURIFIER

BACKGROUND OF THE INVENTION (a) Field of the Invention

The present invention relates to a structure of an impurities collecting bucket for an air separator and purifier, and more particularly to a collecting bucket structure able to extract and separate impurities, including granules or iron filings or oil, water, and the like, from air, and which can also be used for air separation. The collecting bucket is primarily structured to comprise an air guide cover located on an opening at an upper end of a bucket; a guide pipe extends from an air inlet of the air guide cover and connects to a work place, and an air suction port of the air guide cover is series connected to an air inlet of the air separator and purifier using another guide pipe. When in use, impurities are drawn in and retained within the bucket, whereupon filter equipment installed within the air separator and purifier carries out secondary filtration or separation operations. Accordingly, the present invention is able to increase air filtration and separation effectiveness, and extends serviceable life of the filter equipment within the air separator and purifier.

(b) Description of the Prior Art

A general industrial or household dust collector structure of prior art directly stores drawn-in impurities (dust, iron filings, plastic grains, oil or water) in a bag dust filter or collecting bucket disposed within the dust collector. Moreover, functionality of the dust collector structure relies completely on the bag dust filter or collecting bucket to carry out filtering of the dust or separation of impurities. Hence, shortcomings of such prior art structures include the bag dust filter or collecting bucket easily becoming blocked or full, and the main body of the dust collector must be frequently disassembled to clean or replace the bag dust filter and/or the collecting bucket disposed within the structure, thereby causing inconvenience in use and anguish. Accordingly, there is a real need for improvements in the industrial or household dust collector structures of prior art.

In light of the shortcomings of the bag dust filter or collecting bucket disposed within the aforementioned dust collectors of prior art, whereby the impurity contents of the bag dust filter or collecting bucket easily block or fill the bag dust filter or collecting bucket, the inventor of the present invention, having accumulated years of experience in related arts, has meticulously carried out extensive study and exploration to ultimately design a new improved structure of an impurities collecting bucket for an air separator and purifier.

SUMMARY OF THE INVENTION

A primary objective of the present invention is to provide a structure of an impurities collecting bucket for an air separator and purifier, which is a structure installed separate to an air separator and purifier and connected in series thereto, and which is able to effectively retain a large proportion of impurities in an impurities collecting bucket, moreover, preserves the original functionality to remove dust or ash and smoke, oil and smoke, moisture, and so on, of the air separator and purifier, thereby increasing air filtration and separation effectiveness, and extending serviceable life of filter equipment of the air separator and purifier.

Another objective of the present invention is to provide the structure of an impurities collecting bucket for an air separator and purifier, wherein the structure is simple, facilitates disassembly and assembly, and facilitates cleaning out of impurities collected within the bucket.

In order to achieve the aforementioned objectives, the structure of an impurities collecting bucket for an air separator and purifier of the present invention is primarily structured to comprise a bucket and an air guide cover. The air guide cover covers an opening at an upper end of the bucket, and is provided with an air inlet and an air suction port. A guide pipe extends from the air inlet and connects to a work place, and another guide pipe connects the air suction port to an air inlet of an air separator and purifier for series operation. The present invention is characterized in that: The air guide cover comprises a cover plate and a sandwich plate located at a bottom surface thereof, wherein diameter of the sandwich plate is smaller than that of the cover plate, and a plurality of air holes are annular defined between the periphery of the sandwich plate and the cover plate. The air inlet vertically penetrates and downwardly extends through the cover plate and the sandwich plate, and the air suction port located on the cover plate connects a sandwich space formed by the cover plate and the sandwich plate.

According to the aforementioned assembly, when in use, one end of the guide pipe fitted to the air suction port of the impurities collecting bucket is used to connect to the air separator and purifier, and another end of the guide pipe fitted to the air inlet extends to a work place to implement indirect suction operation on impurities. When the air separator and purifier is running, air first passes through the impurities collecting bucket, after which the air enters the air separator and purifier and later discharged therefrom. During operation, negative pressure formed in the pipeline is used to suck in air along with impurities contained therein, and a major portion of the impurities are retained within the bucket, while only some remaining fine dust or oil (water) are sucked into the air separator and purifier along with the air, where secondary or multiple filtration or/and separation operations are carried out using filter equipment installed within the air separator and purifier, thereby increasing air purifying effectiveness and extending serviceable life of the filter equipment within the air separator and purifier, and thus eliminating the need for frequent replacement and cleaning, achieving time-saving and labor saving effectiveness.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

Figure 1:
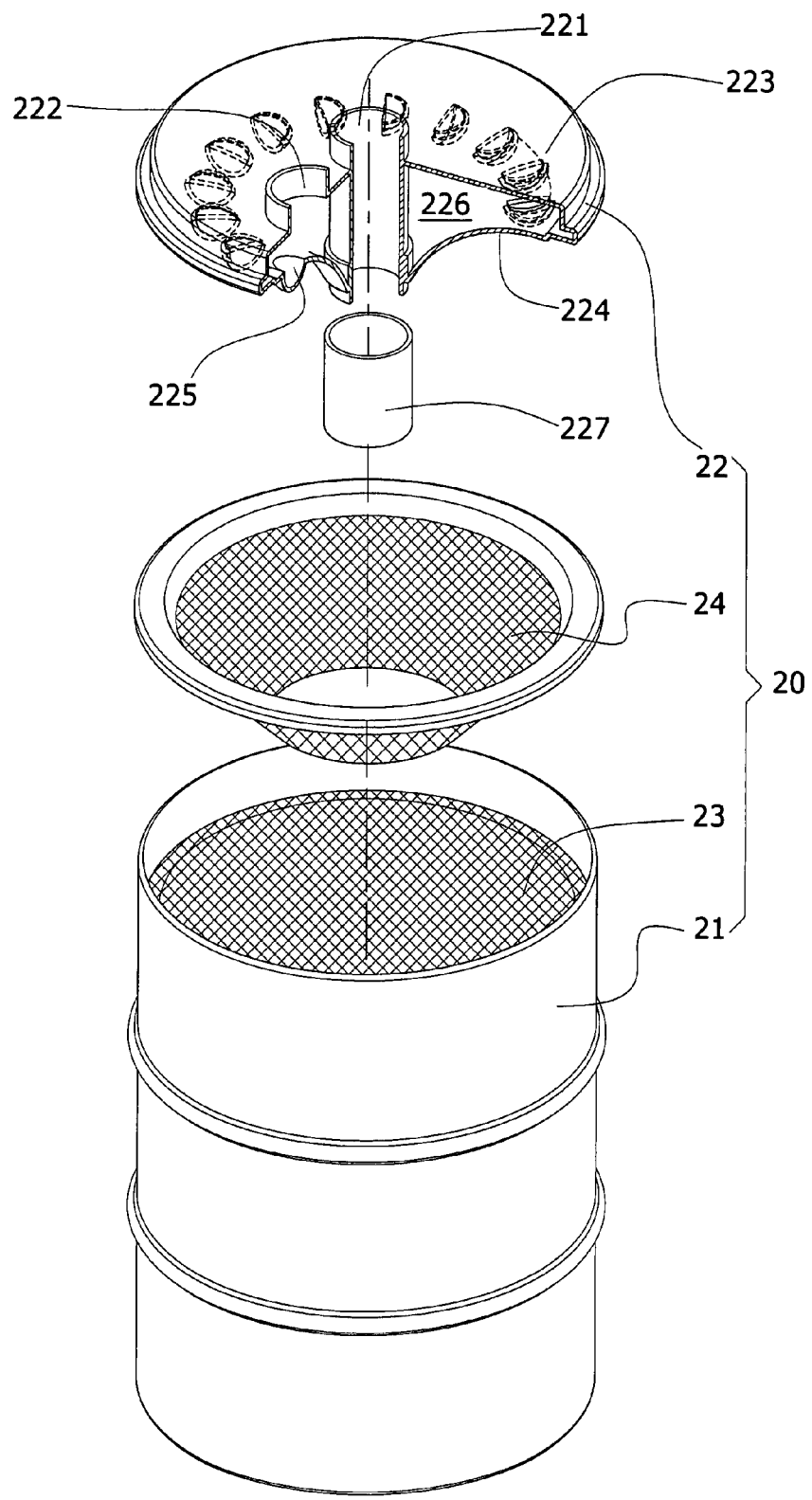
FIG. 1 shows an exploded elevational view of an embodiment according to the present invention.
Figure 2:
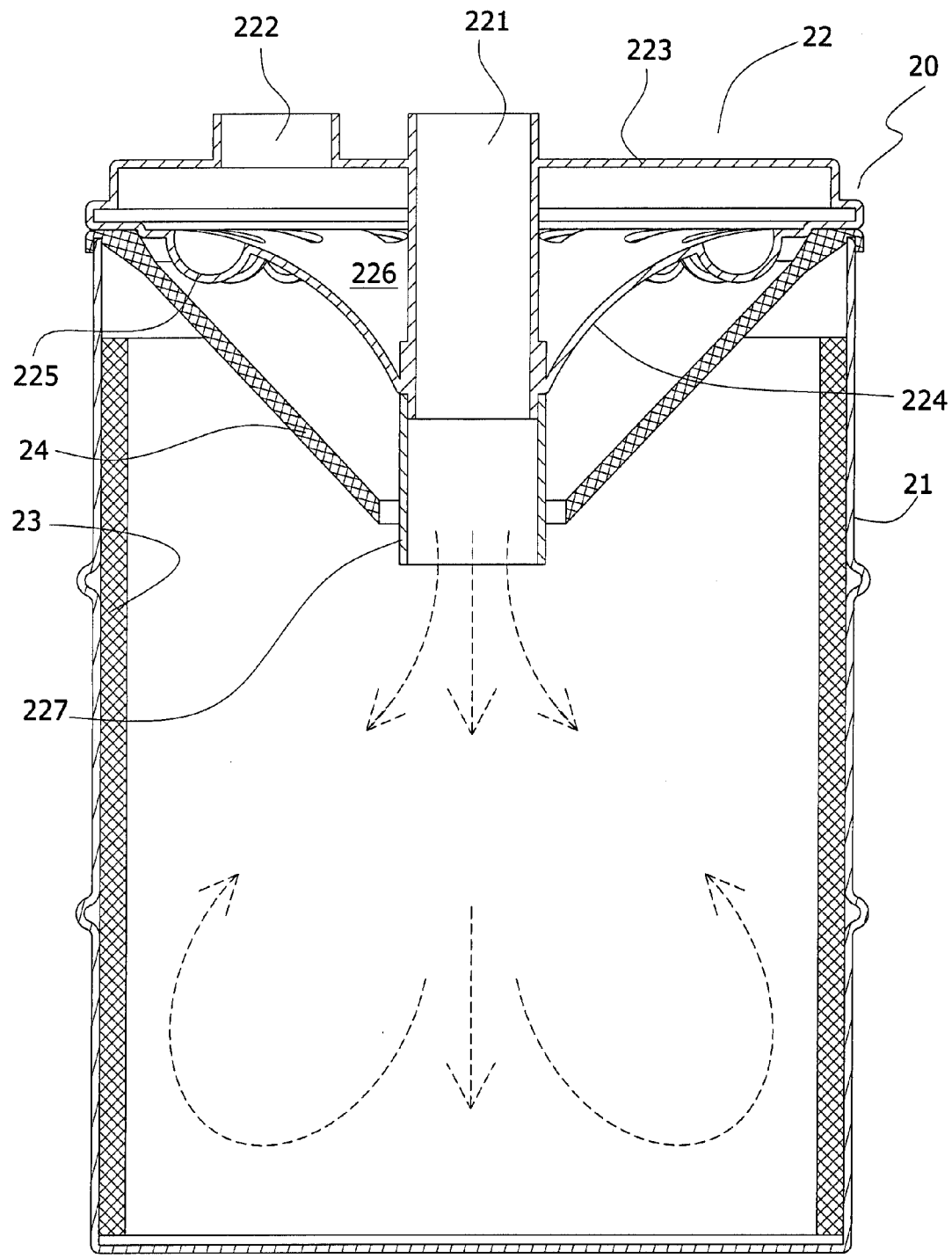
FIG. 2 shows a cross-sectional view of FIG. 1 assembled according to the present invention.
Figure 3:
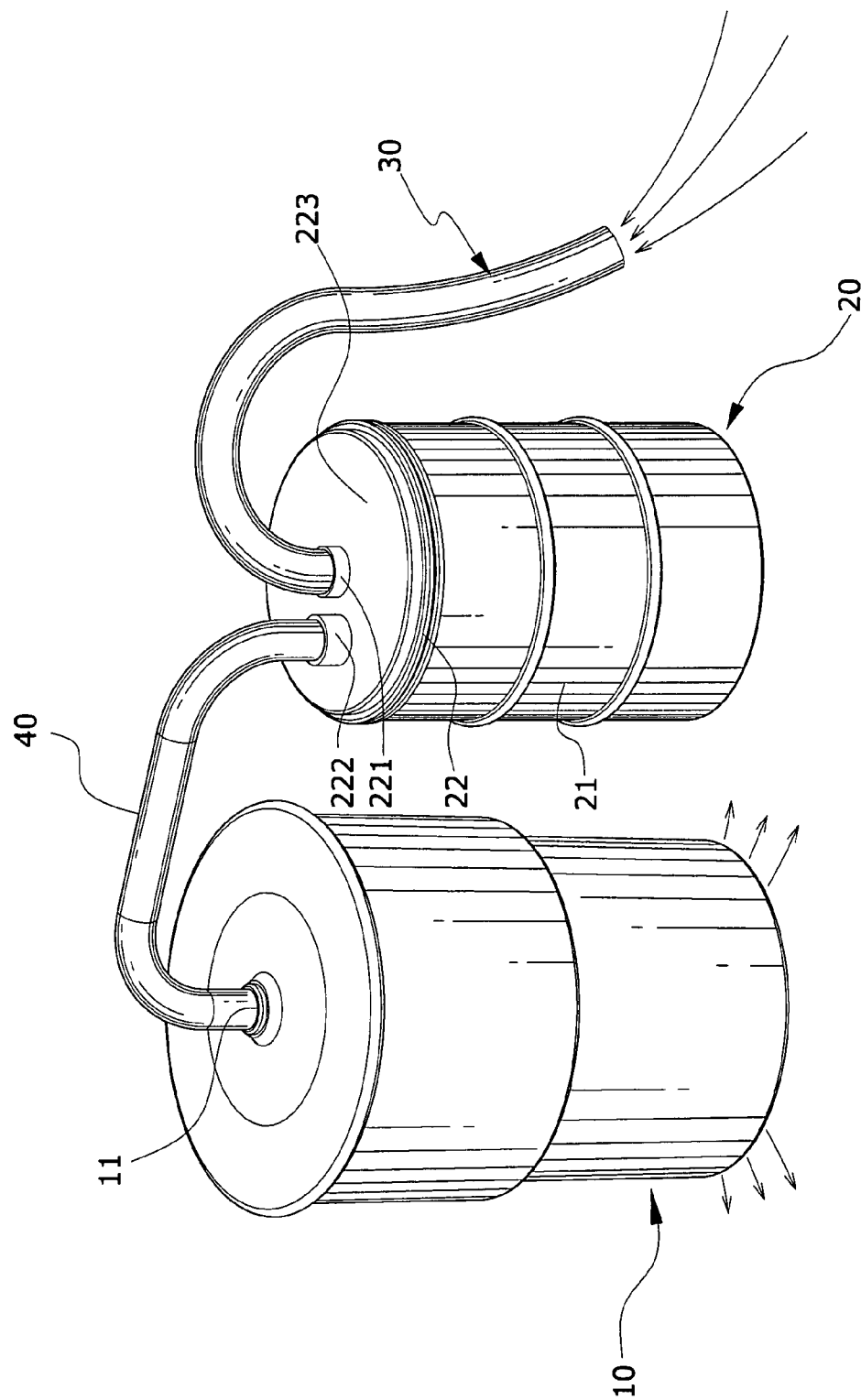
FIG. 3 shows an elevational view of FIG. 1 assembled according to the present invention.

Referring to FIGS. 1 to 3, structure of an impurities collecting bucket 20 for an air separator and purifier 10 as described in the present invention is primarily structured to comprise a bucket 21 and an air guide cover 22. The air guide cover 22 covers an opening at an upper end of the bucket 21, and is provided with an air inlet 221 and an air suction port 222. A guide pipe 30 extends from the air inlet 221 and connects to a work place, and another guide pipe 40 connects the air suction port 222 to an air inlet 11 of the air separator and purifier 10 for series operation. The present invention is characterized in that: The air guide cover 22 comprises a cover plate 223 and a sandwich plate 224 located at a bottom surface thereof, wherein diameter of the sandwich plate 224 is smaller than that of the cover plate 223, and a plurality of air holes 225 are annular defined between the periphery of the sandwich plate 224 and the cover plate 223. The air inlet 221 vertically penetrates and downwardly extends through the cover plate 223 and the sandwich plate 224, and the air suction port 222 located on the cover plate 223 connects a sandwich space 226 formed by the cover plate 223 and the sandwich plate 224.

According to the aforementioned assembly, when in use, one end of the guide pipe 40 fitted to the air suction port 222 of the impurities collecting bucket 20 is used to connect to the air separator and purifier 10, and another end of the guide pipe 30 fitted to the air inlet 221 extends to a work place to implement indirect suction operation on impurities to be processed. When the air separator and purifier 10 is started and sucking in air, then air enters through the external end of the guide pipe 30 connected to the air inlet 221, whereupon the air entering the air inlet 221 is first directly guided towards the bottom portion of the impurities collecting bucket 20, whereupon, after which the returning airflow enters the sandwich space 226 through the air holes 225 on the air guide cover 22 and channeled along the guide pipe 40 connected to the air suction port 222, whereupon the air enters the air inlet 11 of the air separator and purifier 10 and later discharged therefrom.

According to the aforementioned description, during operation of the present invention, negative pressure (suction) formed by the aforementioned air suction pipeline is used to suck in air along with impurities contained therein. Moreover, because diameter of the bucket 21 of the impurities collecting bucket 20 is much greater compared to the diameters of the air inlet 221, the air suction port 222 and the guide pipes 30, 40 connected thereto, thus, negative pressure within the bucket 21 is correspondingly much smaller than negative pressure within the guide pipes 30, 40 (negative pressure and sectional area are inversely proportional). Furthermore, the air holes 225 opening onto the air suction port 222 and annular defined on the periphery of the sandwich plate 224 enable producing a separating effect with the air released by the air inlet 221. However, because the weight of impurities in the air is greater than the suction within the bucket 21, thus, a major portion of the impurities are caused to fall and settle on the bottom portion of the bucket 21, while only some remaining fine dust or oil (water) are sucked into the air separator and purifier 10 along with the air, where secondary or multiple filtration or/and separation operations are carried out using filter equipment (comprising one layer or more than one layer of dust bags or oil screens or activated carbon or electrode mesh, ad so on, and provided with functionality to purify air, including dust removal, oil separation, water removal or/and deodorization, sterilization, increasing negative ions) installed within the air separator and purifier 10, thereby increasing air purifying effectiveness. Furthermore, separated disposition of the impurities collecting bucket 20 of the present invention and the air separator and purifier 10 has a simple structure, disassembly and assembly is convenient, and opening the air guide cover 22 reveals the mere simple bucket 21 structure. Hence, such a configuration facilitates cleaning, thereby achieving time-saving and labor saving effectiveness. Moreover, a major portion of impurities are collected and disposed within the bucket 21, thereby effectively extending serviceable life of the filter equipment and an air extractor within the air separator and purifier 10.

Referring again to the embodiment depicted in FIG. 1 and FIG. 2, wherein a cylindrical filter screen 23 is located on an inner wall of the bucket 21, or/and a funnel-shaped filter screen 24 is located at the opening at the top portion of the bucket 21. Accordingly, disposition of the cylindrical filter screen 23 and the funnel-shaped filter screen 24 (filter screens of different material or mesh of different sizes can be disposed according to the different objects of filtration) is used to filter or block impurities from being sucked into the air separator and purifier 10 through the air holes 225 of the air guide cover 22, thereby increasing filtration effectiveness of the present invention. In addition, an extension pipe 227 can be additionally located on a bottom end of the air inlet 221 of the air guide cover 22, thereby increasing the separating distance between the air inlet 221 and the sandwich space 226, and enabling air sucked to the bottom of the bucket 21 to slowly rise, thus further increasing effectiveness of retaining or filtering impurities.

Figure 4:
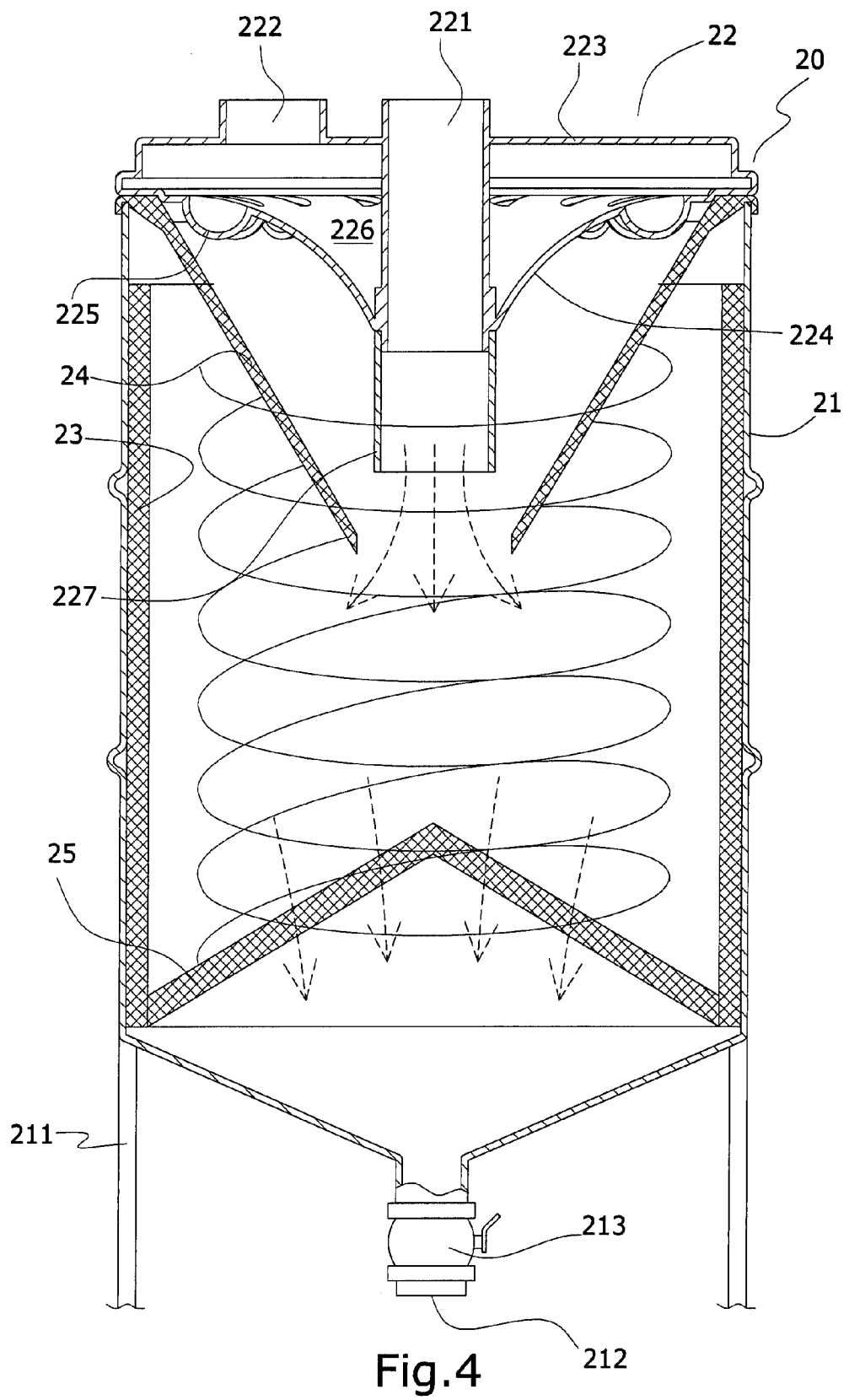
FIG. 4 shows a cross-sectional view of another embodiment according to the present invention.

Referring to FIG. 4, which shows another embodiment of the present invention, wherein the bucket 21 is raised and supported by a stand 211, and a dust discharge opening 212 is downwardly configured at a bottom of the bucket 21. Moreover, the cylindrical filter screen 23, the funnel-shaped filter screen 24 and a bottom layer filter screen 25 are configured as internal layer divisions of the bucket 21. According to the aforementioned structure, when in use, the various filter screens are able to adsorb dust in the air, and using the bottom layer filter screen 25 having a relatively large mesh enables dust or impurities to easily pass through the bottom layer filter screen 25 and be retained on the bottom of the bucket 21. After a certain amount of dust or impurities has accumulated, then a valve body 213 of the dust discharge opening 212 can be opened to easily clean and empty out the dust or impurities within the bucket 21, thereby achieving effectiveness of saving on effort convenience of use.

Figure 5:
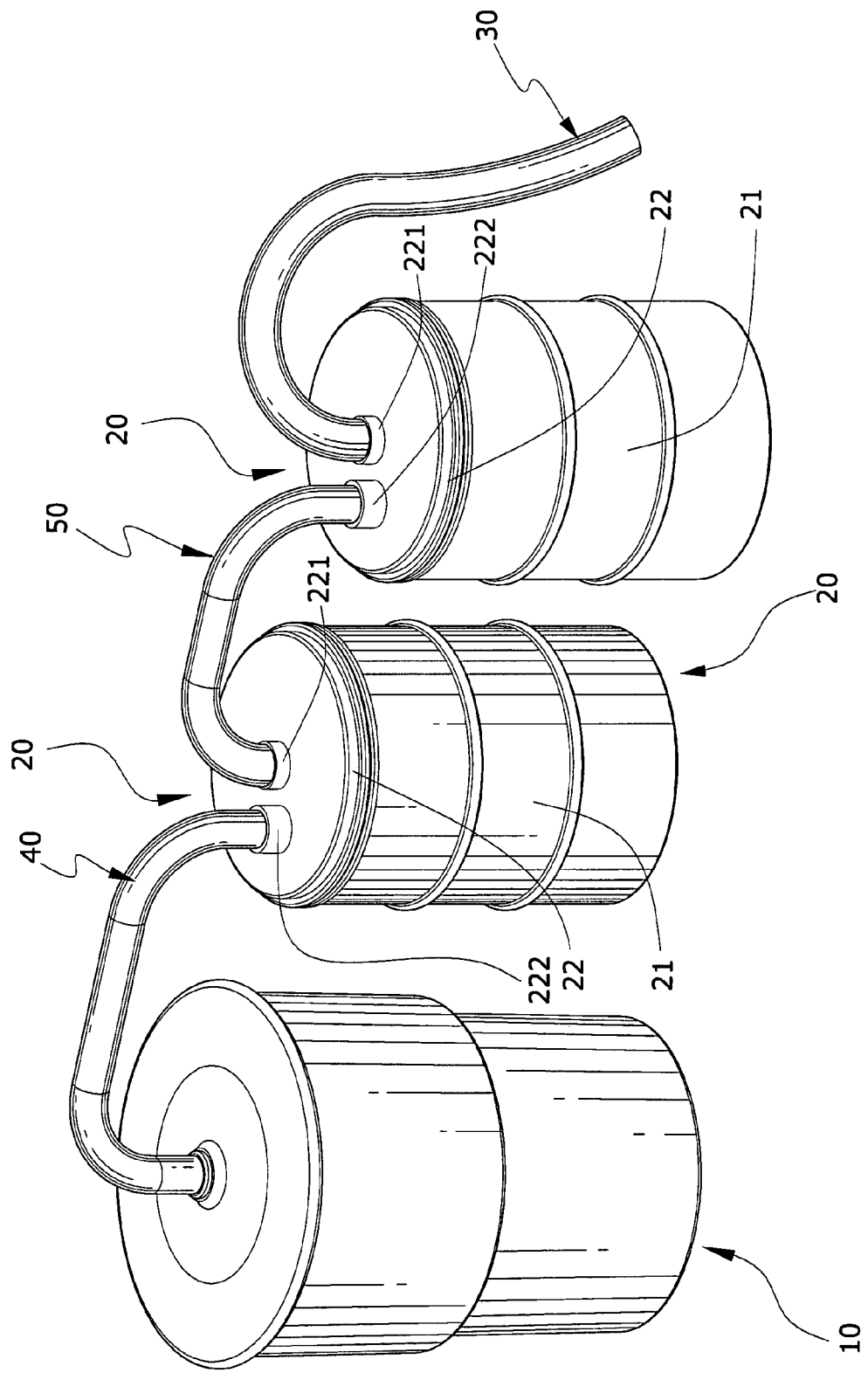
FIG. 5 shows a schematic view depicting varied implementation of the present invention (1).
Figure 6:
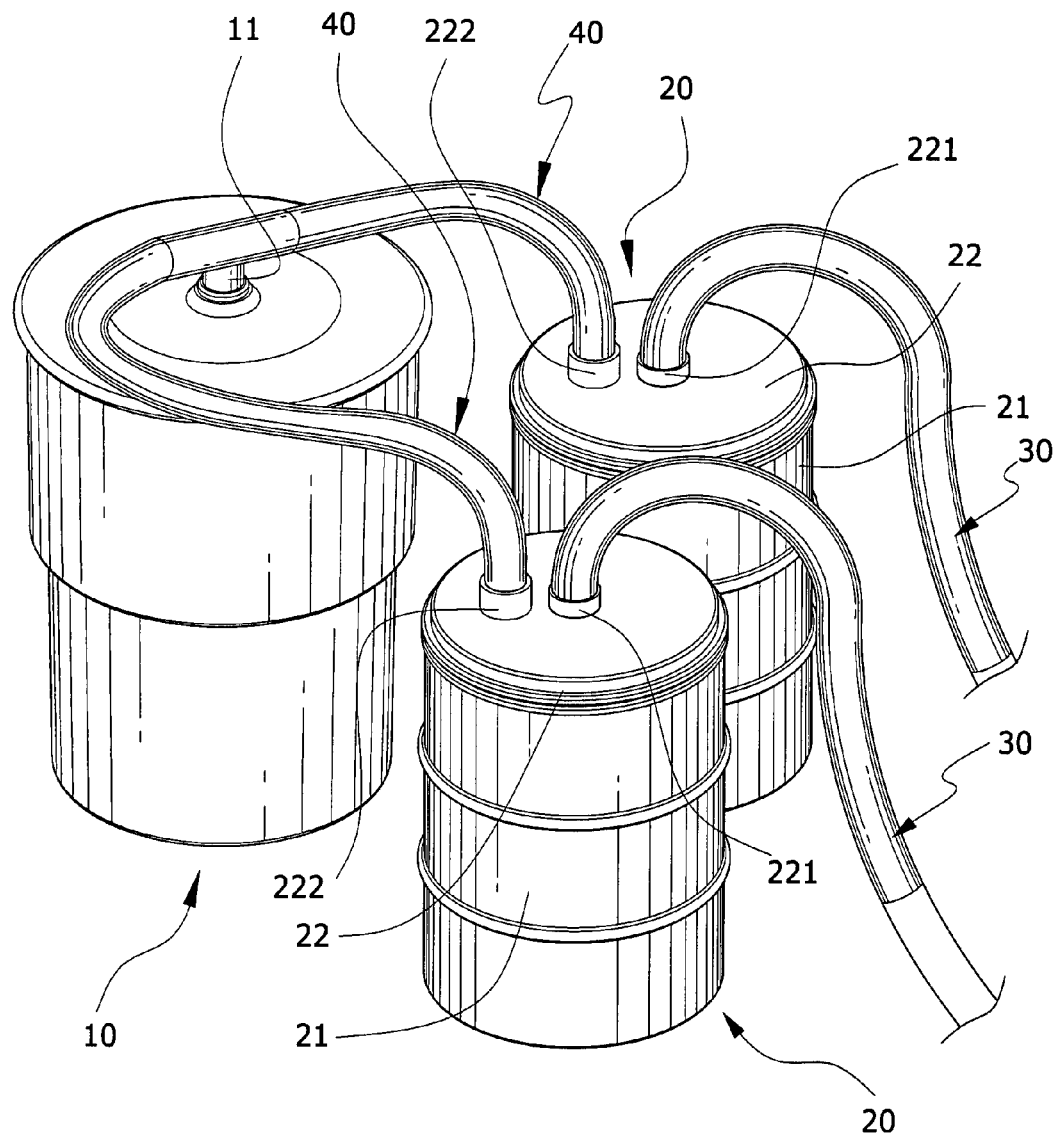
FIG. 6 shows a schematic view depicting varied implementation of the present invention (2).
Figure 7:
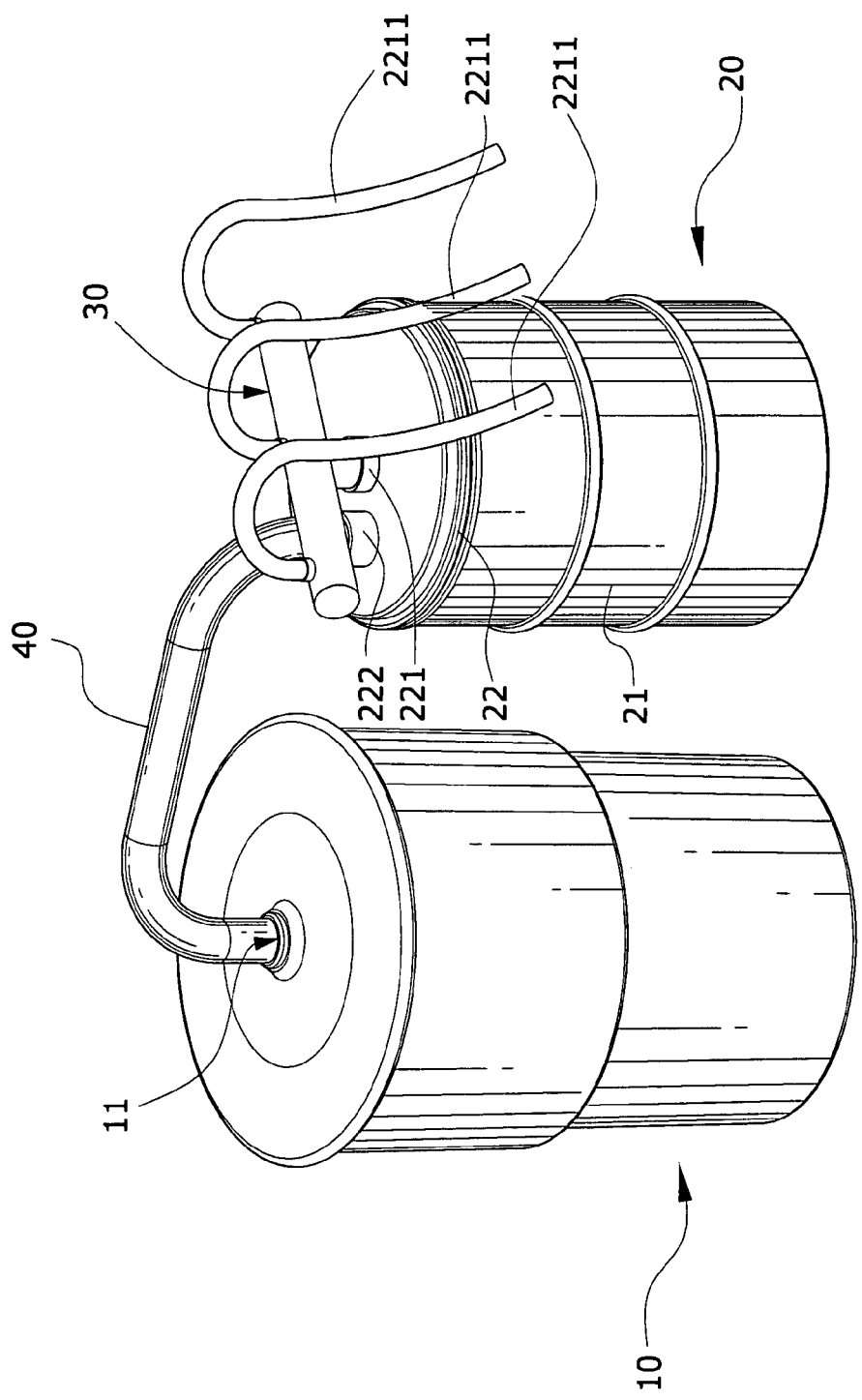
FIG. 7 shows a schematic view depicting varied implementation of the present invention (3).

According to the aforementioned and referring to FIGS. 5 to 7, during actual use of the present invention, a plurality of the identical impurities collecting buckets 20 can also be implemented, wherein a connecting pipe 50 is used in a series connected fashion to implement one embodiment (see FIG. 5), or a parallel connected fashion is used to connect to the air separator and purifier 10 to implement another embodiment (see FIG. 6), or a plurality of small guide pipes 2211 connected to the guide pipe 30 that is connected to the air inlet 221 of the impurities collecting bucket 20 respectively extend to different work places to implement yet another embodiment (see FIG. 7), thereby achieving an improvement in practicability and economic value of the product.

In conclusion, the structure of an impurities collecting bucket for an air separator and purifier of the present invention is clearly able to achieve retaining of impurities within the impurities collecting bucket 20, and, moreover, preserves and extends the original use effectiveness and functionality to remove dust or ash and smoke, oil and smoke, moisture, and so on, of the air separator and purifier 10. Furthermore, prior to this application, products having a similar structure to that of the present invention have not been seen in publications or in public use, thus complying with essential elements as required for a new patent application. Accordingly, a new patent application is proposed herein.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A structure of an impurities collecting bucket for an air separator and purifier, comprising a bucket and an air guide cover; the air guide cover covers an opening at an upper end of the bucket, and is provided with an air inlet and an air suction port, a guide pipe extends from the air inlet and connects to a work place, and another guide pipe connects the air suction port to an air inlet of an air separator and purifier for series operation; wherein:

the air guide cover comprises a cover plate and a sandwich plate located at a bottom surface thereof; diameter of the sandwich plate is smaller than that of the cover plate, and a plurality of air holes are annular defined between the periphery of the sandwich plate and the cover plate; the air inlet vertically penetrates and downwardly extends through the cover plate and the sandwich plate, and the air suction port located on the cover plate connects a sandwich space formed by the cover plate and the sandwich plate.

2. The structure of an impurities collecting bucket for an air separator and purifier according to claim 1, wherein an inner wall of the bucket is fitted with a cylindrical filter screen.

3. The structure of an impurities collecting bucket for an air separator and purifier according to claim 1, wherein a funnel-shaped filter screen is located at an opening at a top portion of the bucket.

4. The structure of an impurities collecting bucket for an air separator and purifier according to claim 1, wherein a bottom layer filter screen is located at a bottom portion of the bucket.

5. The structure of an impurities collecting bucket for an air separator and purifier according to claim 1, wherein a dust discharge opening is downwardly configured at the bottom portion of the bucket.

6. The structure of an impurities collecting bucket for an air separator and purifier according to claim 1, wherein an extension pipe is additionally located on a bottom end of the air inlet of the air guide cover.

* * * * *